B. N. DONLEY.
DETACHABLE HANDLE.
APPLICATION FILED JULY 9, 1921.

1,423,406. Patented July 18, 1922.

Bert N. Donley
INVENTOR

BY Victor J. Evans
ATTORNEY

WITNESS:

UNITED STATES PATENT OFFICE.

BERT N. DONLEY, OF MUSCATINE, IOWA.

DETACHABLE HANDLE.

1,423,406.  Specification of Letters Patent.  Patented July 18, 1922.

Application filed July 9, 1921. Serial No. 483,636.

*To all whom it may concern:*

Be it known that I, BERT N. DONLEY, a citizen of the United States, residing at Muscatine, in the county of Muscatine and State of Iowa, have invented new and useful Improvements in Detachable Handles, of which the following is a specification.

This invention relates to improvements in detachable handles and has for an object the provision of a handle which is capable of being removably secured to a receptacle, the invention being especially adapted for use in connection with coffee pots or like utensils.

Another object of the invention is the provision of a detachable handle for the above purpose which is frictionally held in place in a manner to prevent accidental removal, yet permit of the handle being readily disconnected from the coffee pot without the necessity of manipulating spring latches, screws or other movable fastening devices.

Another object of the invention is the provision of novel means for securing the attaching means to the handle so that the former may be easily, quickly and securely held in place.

With the above and other objects in view, the invention further includes the following novel features and details of construction, to be hereinafter more fully described, illustrated in the accompanying drawings and pointed out in the appended claims.

In the drawings:—

Figure 1:
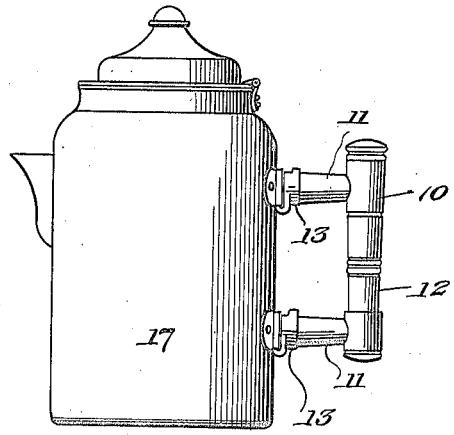
Figure 1 is a side elevation of a coffee pot with the invention applied thereto.
Figure 2:
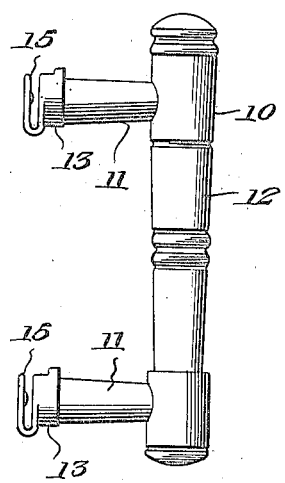
Figure 2 is an enlarged elevation showing the handle removed from the pot.
Figure 3:
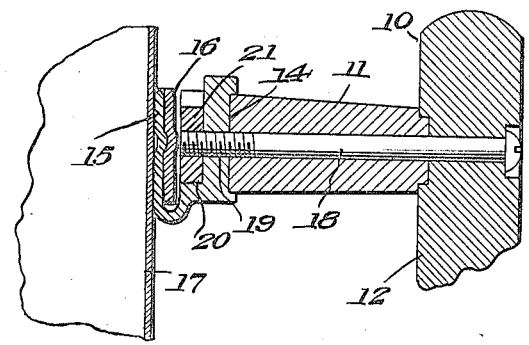
Figure 3 is an enlarged fragmentary sectional view showing the manner of engagement between the removable handle and the pot.
Figure 4:
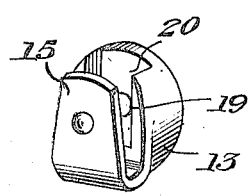
Figure 4 is a detail perspective view of one of the handle carried engaging members.
Figure 5:
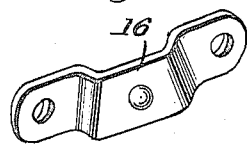
Figure 5 is a like view of one of the loops carried by the coffee pot.

Referring in detail to the drawings, wherein like characters of reference denote corresponding parts, the reference character 10 indicates a handle which may be of suitable style and configuration, the one shown being of a type commonly used upon coffee pots or like vessels and including a pair of spaced arms 11 and a grip 12 which connects the arms.

Secured to each of the arms 11 is an engaging member 13, the latter comprising a body portion which is provided upon one side with a socket 14 for the reception of the end of one of the arms 11. From the opposite side of the body portion, the engaging member carries a tongue 15 which is spaced from the body member and is connected to the latter along its bottom.

This tongue is adapted for engagement with spaced loops 16 which are secured to the coffee pot 17. These loops include perforated ears and intermediate offset portions, as shown and the tongues are adapted to be inserted within the loops between the offset portion and the outer wall of the coffee pot and to be frictionally held therein. The weight of the pot is thus supported upon that portion of the engaging member which connects the tongue to the body portion, so that when the pot is lifted the connection with the handle will be secure. The handle may be readily removed however, by forcing the same downwardly to disengage the tongues from the loops.

For the purpose of securing the engaging members 13 to the arms 11, there is provided screws 18 which extend longitudinally through the arms and have their threaded extremities passing through openings 19 provided in the engaging members and entering seats or sockets 20, also provided in the engaging members. These seats or sockets are of rectangular shape and are adapted to receive nuts 21 which engage the threaded end of the screws 18. The engaging members may thus be securely held in position and the nuts prevented from rotation. This facilitates the assembling of the handle and permits of the parts being easily adjusted should they become loose.

The invention is susceptible of various changes in its form, proportions and minor details of construction and the right is herein reserved to make such changes as properly fall within the scope of the appended claims.

Having described the invention what is claimed is:—

1. The combination with a receptacle, of a handle, an engaging member carried by the handle, said member being provided with a socket to receive the handle, a tongue included in the engaging member, a screw carried by the handle and extending through said member, a seat provided in the member for the reception of a nut, to engage the bolt and hold the engaging member secured to the handle and a loop carried by the receptacle for engagement by the tongue.

2. The combination with a receptacle, of a handle including a pair of spaced arms and a grip connecting the arms, an engaging member secured to each of the spaced arms, tongues carried by the engaging members, nut and bolt connections for securing the engaging members to the arms, seats formed in the engaging members to hold the nuts against rotation and loops carried by the receptacle for frictional engagement by the tongues.

In testimony whereof I affix my signature.

BERT N. DONLEY.